(12) United States Patent
Schatzberg et al.

(10) Patent No.: US 9,629,116 B2
(45) Date of Patent: Apr. 18, 2017

(54) APPARATUS, SYSTEM AND METHOD OF ESTIMATING A LOCATION OF A MOBILE DEVICE

(71) Applicant: INTEL IP CORPORATION, Santa Clara, CA (US)

(72) Inventors: Uri Schatzberg, Kiryat Ono (IL); Leor Banin, Petach Tikva (IL); Yuval Amizur, Kfar Saba (IL)

(73) Assignee: INTEL IP CORPORATION, Santa Clara, CA (US)

( * ) Notice: Subject to any disclaimer, the term of this patent is extended or adjusted under 35 U.S.C. 154(b) by 96 days.

(21) Appl. No.: 14/129,300

(22) PCT Filed: May 26, 2013

(86) PCT No.: PCT/US2013/042783
§ 371 (c)(1),
(2) Date: Dec. 26, 2013

(87) PCT Pub. No.: WO2014/193335
PCT Pub. Date: Dec. 4, 2014

(65) Prior Publication Data
US 2014/0349675 A1     Nov. 27, 2014

(51) Int. Cl.
*H04W 64/00* (2009.01)
*G01S 13/76* (2006.01)
(Continued)

(52) U.S. Cl.
CPC ............... *H04W 64/00* (2013.01); *G01S 5/02* (2013.01); *G01S 5/021* (2013.01); *G01S 5/06* (2013.01);
(Continued)

(58) Field of Classification Search
CPC ..... H01J 49/0036; H01J 49/022; H04W 4/02; H04W 64/00; H04M 1/00; G01S 5/0215; G01S 5/14; G01S 5/021; G01S 5/06
(Continued)

(56) References Cited

U.S. PATENT DOCUMENTS

2004/0072582 A1    4/2004   Aljadeff et al.
2007/0121679 A1    5/2007   Strutt
(Continued)

FOREIGN PATENT DOCUMENTS

CN         1890992 A      1/2007
CN       101825696 A      9/2010
(Continued)

OTHER PUBLICATIONS

International Search Report and Written Opinion for PCT Patent Application No. PCT/US2013/042783, mailed on Feb. 26, 2014, 15 pages.
(Continued)

*Primary Examiner* — Inder Mehra
(74) *Attorney, Agent, or Firm* — Shichrur & Co.

(57) ABSTRACT

Some demonstrative embodiments include devices, systems and/or methods of estimating a location of a mobile device. For example, an apparatus may include a wireless communication unit to communicate Time of Flight (ToF) accuracy information corresponding to a location area. The ToF accuracy information may include at least one accuracy indicator corresponding to at least one wireless communication device. The accuracy indicator may indicate an accuracy of a ToF measurement at the location area with the wireless communication device.

27 Claims, 5 Drawing Sheets

(51) Int. Cl.
*G01S 5/06* (2006.01)
*G01S 5/14* (2006.01)
*G01S 5/02* (2010.01)

(52) U.S. Cl.
CPC ............ *G01S 13/767* (2013.01); *G01S 5/0273* (2013.01); *G01S 5/14* (2013.01)

(58) Field of Classification Search
USPC ............ 455/456.1, 404.2, 502; 370/252, 516
See application file for complete search history.

(56) References Cited

U.S. PATENT DOCUMENTS

| | | | |
|---|---|---|---|
| 2008/0009295 A1 | 1/2008 | Brousseau et al. | |
| 2010/0094482 A1 | 4/2010 | Schofield et al. | |
| 2010/0190509 A1* | 7/2010 | Davis ................. | H04W 56/006 455/456.1 |
| 2010/0259450 A1 | 10/2010 | Kainulainen et al. | |
| 2011/0051608 A1 | 3/2011 | Lee et al. | |
| 2011/0117924 A1 | 5/2011 | Brunner et al. | |
| 2011/0188389 A1 | 8/2011 | Hedley et al. | |
| 2012/0188128 A1 | 7/2012 | Ranki et al. | |
| 2012/0208557 A1 | 8/2012 | Carter | |
| 2014/0183353 A1* | 7/2014 | Shimada ............. | H01J 49/0036 250/282 |
| 2014/0235264 A1* | 8/2014 | Venkatraman ......... | H04W 4/02 455/456.1 |
| 2014/0335885 A1* | 11/2014 | Steiner et al. ............. | 455/456.1 |

FOREIGN PATENT DOCUMENTS

| | | |
|---|---|---|
| JP | 2005223436 | 8/2005 |
| JP | 2005536944 | 12/2005 |
| JP | 2007141115 | 6/2007 |
| KR | 20120072391 | 7/2012 |
| WO | 2011107825 | 9/2011 |

OTHER PUBLICATIONS

Wireless Gigabit Alliance (WGA) Specifications; WiGig MAC and PHY Specification Version 1.1, Apr. 2011—Final Specification; 442 pages.

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.

Wi-Fi Alliance Technical Committee P2P Task Group; Wi-Fi Peer-to-Peer (P2P) Technical Specification; Version 1.2; Dec. 14, 2011; 160 pages.

Open Mobile Alliance, Secure User Plane Location Architecture, OMA-AD-SUPL-V2_0-20120417-A, Version 2.0, Apr. 17, 2012, 51 pages.

W3C, Geolocation API Specification, W3C Proposed Recommendation May 10, 2012, 18 pages.

Office Action of Japanese Patent Application No. 2015-520197, mailed on Oct. 13, 2015, 6 pages (including 3 pages of English translation).

Office Action for Chinese Patent Application No. 201380034355.6, mailed on Dec. 2, 2015, 10 pages.

Office Action for Chinese Patent Application Serial No. 201380034355.6, mailed on Jun. 3, 2016, 10 pages.

Tappero, F. "Decimeter-Level Positioning Engine for an Indoor Ultra-Wideband/Laser Scanner Positioning System", European Navigation Conference—Global Navigation Satellite Systems (ENC-GNSS), 2009, 9 pages.

Office Action for Korean Patent Application No. 2014-7033594, mailed on Sep. 30, 2016, 6 pages (Including 3 pages of English translation).

Office Action for Korean Patent Application Serial No. 20147033594, mailed on Mar. 14, 2016, 8 pages (including 4 pages of English translation.).

* cited by examiner

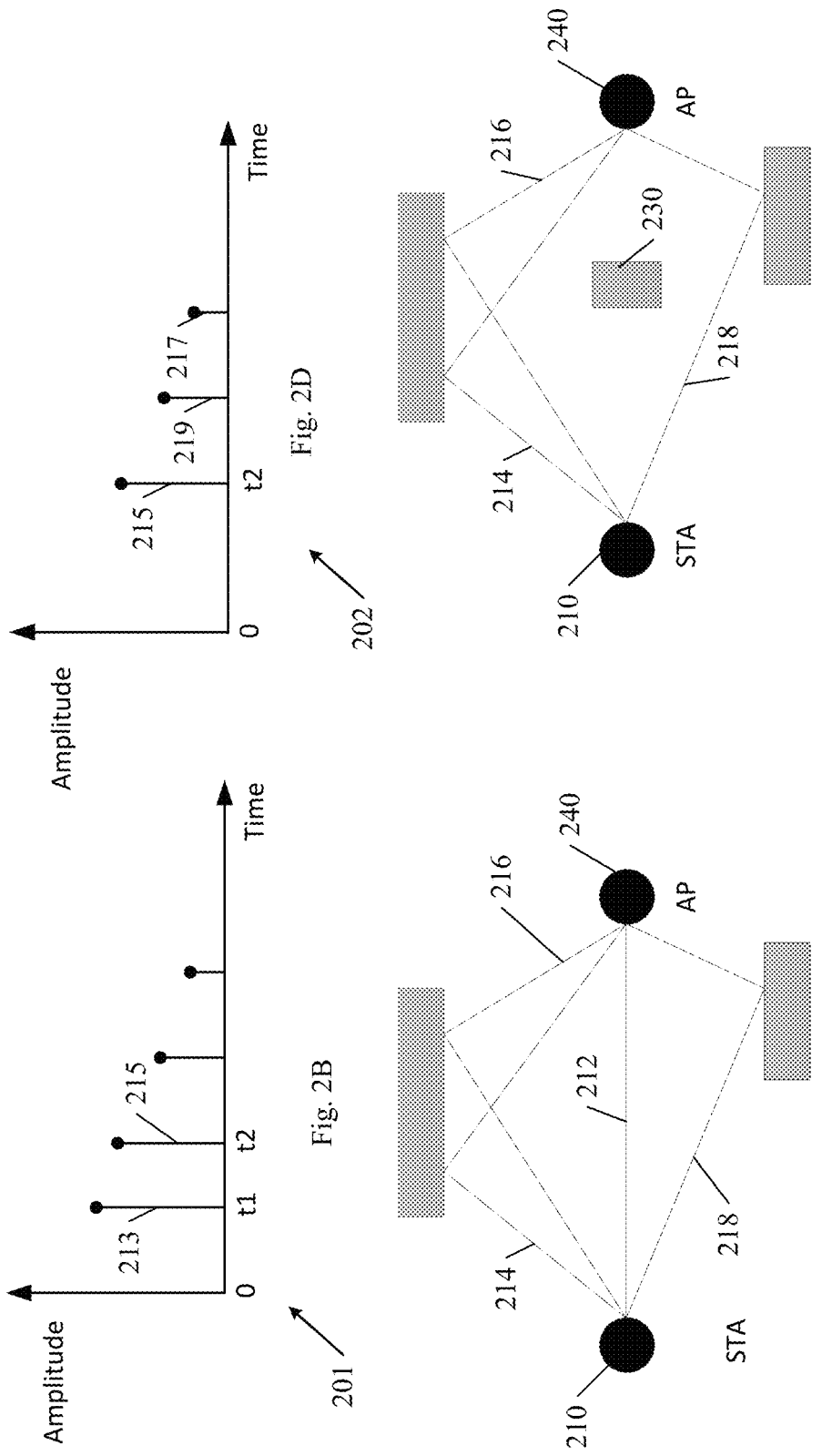

APPARATUS, SYSTEM AND METHOD OF ESTIMATING A LOCATION OF A MOBILE DEVICE

CROSS REFERENCE

This application is a National Phase Application of PCT International Application No. PCT/US2013/42783, International Filing Date May 26, 2013, the entire disclosure of which is incorporated herein by reference.

TECHNICAL FIELD

Embodiments described herein generally relate to estimating a location of a mobile device.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem. This problem does not yet have a scalable solution with satisfactory precision.

One solution for indoor navigation includes a Time-of-Flight (ToF) measurement method. The ToF may be defined as the overall time a signal propagates from a first station, e.g., a user ("client") mobile device, to a second station, e.g., an access point (AP), and back to the first station. A distance between the first and second stations may be calculated based on the ToF value, for example, by dividing the ToF value by two and multiplying the result by the speed of light.

An estimated location of the first station may be determined by calculating two or more distances between the first station and two or more other stations, e.g., other APs, by utilizing a suitable method, e.g., a trilateration method.

The location calculation method may not provide a location estimation with a desired accuracy, for example, if the one or more distances do not have a desired accuracy.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2A is a schematic illustration of a mobile device at a location having a line of sight (LOS) with a node, and FIG. 2B is a schematic illustration of a graph depicting amplitudes and time delays of propagation paths between the mobile device and the node, in accordance with some demonstrative embodiments.

FIG. 2C is a schematic illustration of a blocked LOS between the mobile device and the node of FIG. 2A, and FIG. 2D is a schematic illustration of a graph depicting amplitudes and time delays of propagation paths between the mobile device and the node when the LOS is blocked, in accordance with some demonstrative embodiments.

DETAILED DESCRIPTION

Figure 1:
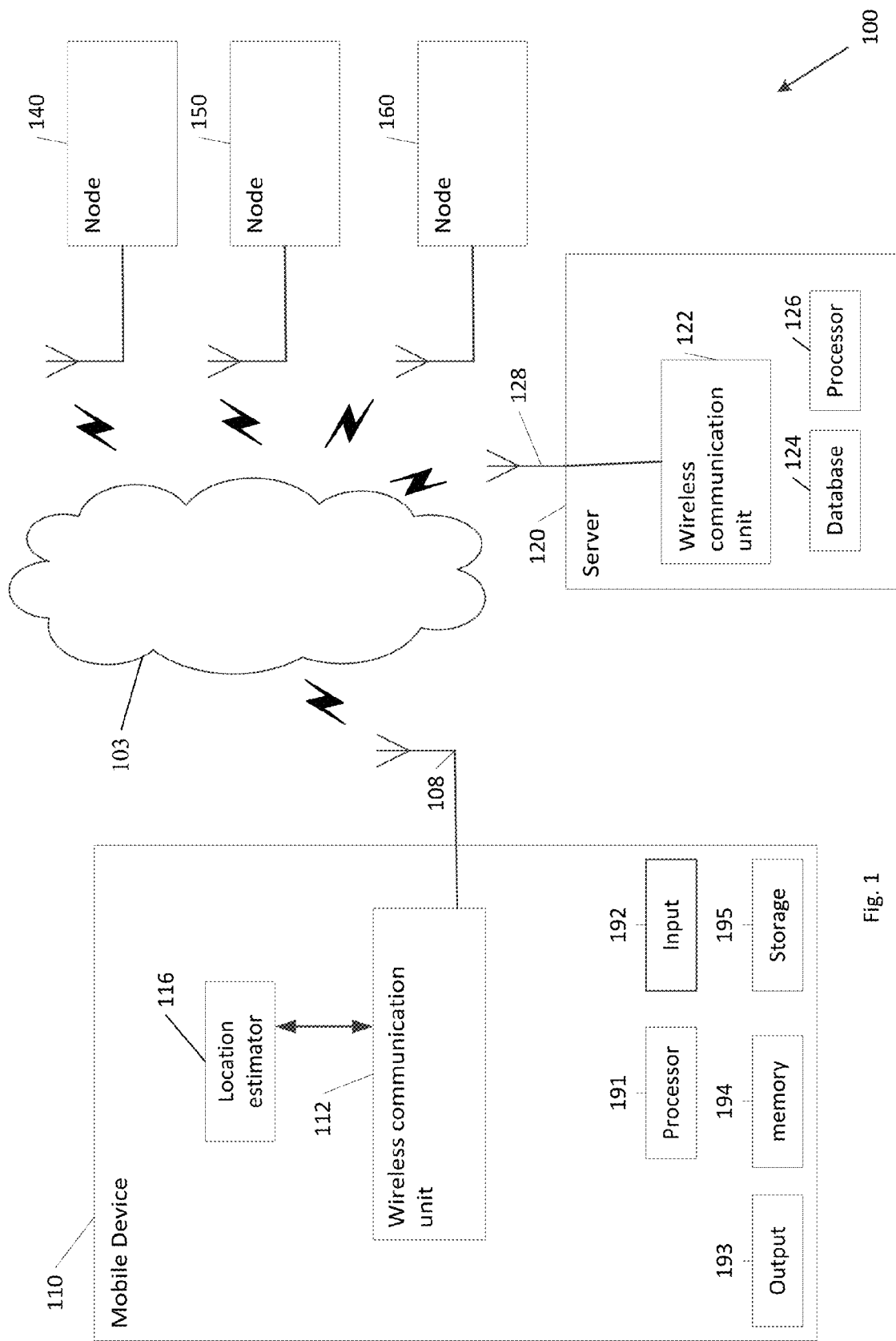
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V)

device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11*: Wireless LAN Medium Access Control (MAC) and Physical Layer (PHY) Specifications*, Mar. 29, 2102; IEEE802.11 task group ac (TGac) (*"IEEE802.11-09/0308r12—TGac Channel Model Addendum Document"*); IEEE 802.11 task group ad (TGad) (*IEEE P802.11ad Standard for Information Technology—Telecommunications and Information Exchange Between Systems—Local and Metropolitan Area Networks—Specific Requirements—Part* 11*: Wireless LAN Medium Access Control (MAC) and Physical Layer (PHY) Specifications—Amendment* 3*: Enhancements for Very High Throughput in the* 60 *GHz Band*)) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.3, 2012) and/or future versions and/or derivatives thereof, devices and/or networks operating in accordance with existing cellular specifications and/or protocols, e.g., $3^{rd}$ Generation Partnership Project (3GPP), 3GPP Long Term Evolution (LTE), and/or future versions and/or derivatives thereof, devices and/or networks operating in accordance with existing Open Mobile Alliance (OMA) standards, including the Secure User Plane Location (SUPL) protocol (*SUPL-OMA-AD-SUPL-V2.0 5.3.1.8*) and/or future versions and/or derivatives thereof, devices and/or networks operating in accordance with existing World-Wide-Web Consortium (W3C) standards, including the *W3C Hypertext Markup Language (HTML) Version* 5, October 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM) 103. For example, system 100 may include one or more mobile devices, e.g., a mobile device 110, a server 120 and/or one or more wireless communication nodes, e.g., node 140, node 150 and/or node 160. Wireless medium 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include one or more client STAs, and one or more APs. For example, device 110 may perform the functionality of a client STA and server 120, node 140, node 150 and/or node 160 may perform the functionality of an AP, e.g., a WiFi AP, a router, and the like.

In some demonstrative embodiments, server 120, node 140, node 150 and/or node 160 may include a mobile or a non-mobile device, e.g., a static device.

In some demonstrative embodiments, server 120, node 140, node 150 and/or node 160 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, mobile device 110 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a CSLL device, an UMD, an UMPC, a MID, an "Origami" device or computing device, a video device, an audio device, an A/V device, a gaming device, a media player, a Smartphone, or the like.

In some demonstrative embodiments, device 110, server 120, node 140, node 150 and/or node 160 may include wireless communication units, to perform wireless communication between device 110, server 120, node 140, node 150, node 160 and/or with one or more other wireless communication devices. For example, device 110 may include a wireless communication unit 112, and/or server 120 may include a wireless communication unit 122.

In some demonstrative embodiments, the wireless communication units may include, or may be associated with, one or more antennas. For example, wireless communicate unit 112 may be associated with one or more antennas 108 and wireless communicate unit 122 may be associated with one or more antennas 128.

Antennas 108 and/or 128 may include any type of antennas suitable for transmitting and/or receiving wireless communication signals, blocks, frames, transmission streams, packets, messages and/or data. For example, antennas 108 and/or 128 may include any suitable configuration, structure and/or arrangement of one or more antenna elements, components, units, assemblies and/or arrays. Antennas 108 and/or 128 may include, for example, antennas suitable for directional communication, e.g., using beamforming techniques. For example, antennas 108 and/or 128 may include a phased array antenna, a multiple element antenna, a set of switched beam antennas, and/or the like. In some embodiments, antennas 108 and/or 128 may implement transmit and receive functionalities using separate transmit and receive antenna elements. In some embodiments, antennas 108 and/or 128 may implement transmit and receive functionalities using common and/or integrated transmit/receive elements.

In some demonstrative embodiments, mobile device 110 may also include, for example, a processor 191, an input unit 192, an output unit 193, a memory unit 194, and a storage unit 195. Mobile device 110 may optionally include other suitable hardware components and/or software components. In some demonstrative embodiments, some or all of the components of mobile device 110 may be enclosed in a common housing or packaging, and may be interconnected or operably associated using one or more wired or wireless links. In other embodiments, components of mobile device 110 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 111 executes instructions, for example, of an Operating System (OS) of mobile device 110 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 110.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, mobile device 110, server 120 and one or more nodes, e.g., node 140, node 150 and/or node 160, may be located in an indoor location, for example, a mall, a building, an office and/or the like. In other embodiments, mobile device 110, server 150 and one or more nodes, e.g., node 140, node 150 and/or node 160, may be located in any other location, e.g., an indoor and/or an outdoor location.

In some demonstrative embodiments, mobile device 110 may estimate a location of mobile device 110 within the indoor location based on a Time of Flight (ToF) measurement.

The ToF may be defined as the overall time a signal propagates from a first station, e.g., device 110, to a second station, e.g., node 140, node 150 or node 160, and back to the first station. A distance between the first and second stations may be determined based on the ToF value, for example, by dividing the ToF value by two and multiplying the result by the speed of light.

Device 110 may determine a relative location, e.g., a distance, of device 110 with respect to a node, e.g., node 140, based on the ToF measurement. Device 110 may determine an estimated location of device 110, by calculating additional distances, e.g., two or more distances, between device 102 and two or more other stations, e.g., nodes 150, 160, and/or other nodes, for example, by utilizing trilateration techniques.

In one example, device 110 may perform a ToF measurement with node 140 to determine a relative location of device 110 with respect to node 140.

The ToF measurement performed between device 110 and node 140 may result in a non-accurate or an erroneous location, for example, if the ToF measurement is not accurate. For example, the ToF measurement may not be accurate, e.g., if a Line of Sight (LoS) between node 140 and device 110 is blocked, e.g., by a metal object, a wall and/or the like.

Blockage of the LOS between mobile device 110 and node 140 may increase the length of the path between mobile device 110 and node 140, may increase the ToF between device 110 and node 140, and accordingly, may increase the estimated distance between node 140 and mobile device 110, e.g., as described below with reference to FIGS. 2A, 2B, 2C and 2D.

Reference is made to FIG. 2A, which schematically illustrates a mobile device (STA) 210 at a location having a LOS with a node (AP) 240 in an indoor location 200, and FIG. 2B schematically illustrates a graph 201 depicting amplitudes and time delays of propagation paths between mobile device 210 and node 240, in accordance with some demonstrative embodiments. For example, device 210 may perform the functionality of device 110 (FIG. 1) and/or node 240 may perform the functionality of node 140 (FIG. 1).

As shown in FIG. 2A, one or more components of a wireless communication signal transmitted by node 240 may be propagated between node 240 and device 210 via one or more propagation paths, e.g., a path 212, a path 214, a path 216 and/or a path 218.

As shown in FIG. 2A, path 212 is the LOS path between device 210 and node 240, e.g., the straight and/or direct line between device 210 and node 240. Paths 214, 216 and 218 are indirect paths between device 210 and node 240, for example, reflections of the signal from one or more objects in indoor location 200, e.g., walls, a ceiling, the ground, and/or the like.

In some demonstrative embodiments, device 210 may receive the one or more components of the signal transmitted from node 240 via paths 212, 214, 216, and/or 218.

As shown in FIG. 2B, the one or more components received by device 210 via paths 212, 214, 216, and/or 218 may be received by device 210 at different times, e.g., due to different lengths of paths 212, 214, 216, and/or 218, and/or with different amplitudes, e.g., due to path loss and/or attenuation.

As shown in FIG. 2B, a component of the signal received by device 240 via LOS path 212 may have a maximal amplitude 213, for example, compared to an amplitude of any other component of the signal, which is received via a path different from the LOS path. For example, an amplitude 215 of a component of the signal received via path 214 may be lesser than amplitude 213. In other embodiments, the first component of the signal received by device 240, e.g., via LOS path 212, may not have the maximal amplitude. For example, amplitude 215 may be lesser than an amplitude of another component of the signal, e.g., a component of the signal received by device 240 via path 214.

As shown in FIG. 2B, the component of the signal received by device 210 via LOS path 212 may have a minimal propagation time, denoted t1, between device 210 and node 240, and, accordingly, may be the first component received by device 210. For example, propagation time t1 may be minimal compared to a propagation time of any other component of the signal, which is received via a path different from the LOS path. In one example, a propagation time, denoted t2, of the component of the signal received via path 214 may be greater than the propagation time t1.

In some demonstrative embodiments, device 210 may determine a ToF between device 210 and node 240 based on the first received component of the signal, e.g., assuming that the first received component propagated via the LOS path. For example, device 210 may determine the ToF between device 210 and node 240 based on the propagation time t1.

In one example, device 210 may be able to determine a relative distance between AP 240 and device 110 based on the time t1, for example, by multiplying the propagation time t1 by the speed of light.

In some demonstrative embodiments, the relative distance calculated by device 210 based on propagation time t1 may be relatively accurate, e.g., since propagation time t1 corresponds to LOS path 212.

Reference is made to FIG. 2C, which schematically illustrates mobile device 210 and node 240, when an obstacle 230 blocks LOS path 212, and FIG. 2D schematically illustrates a graph 202 depicting amplitudes and time delays of the propagation paths, when obstacle 230 blocks LOS path 212, in accordance with some demonstrative embodiments.

As shown in FIG. 2C, device 210 may not receive a component of the signal from node 240 via LOS path 212, e.g., prior to receiving one or more other components of the signal via one or more other paths.

As shown in FIG. 2D, the component of the signal received via path 214 may have maximum amplitude 215, e.g., compared to an amplitude 219 of a component of the signal received via path 218 and/or an amplitude 217 of a component of the signal received via path 216, for example, when LOS path 212 is blocked. In other embodiments, the amplitude of the signal component received via path 214 may be lesser than the amplitude of signals components received via one or more other paths.

As shown in FIG. 2D, the component of the signal received via path 214 may have the propagation time t2, e.g., compared to the propagation time of the components received via paths 216 and/or 218, and, accordingly, may be the first component received by device 210, for example, when LOS path 212 is blocked.

Accordingly, device 210 may determine a ToF between device 210 and node 240 based on the propagation time t2, e.g., assuming that the received component via path 214 is received via the LOS path, for example, although path 214 is not the LOS path.

As shown in FIG. 2B, the propagation time t2 may be greater than the propagation time t1 via the LOS path 212.

Accordingly, a relative distance between AP 240 and device 110 determined based on the time t2 may include an error, which may be determined, e.g., as follows:

$$\text{Error} = (t2 - t1) * C \quad (1)$$

wherein, C denotes the speed of light, e.g., in meters per second, and Error denotes the error, e.g., in meters, between the relative distance calculated based on the time t1 and the relative distance calculated based on the time t2. For example, a delay of one nanosecond (ns) may result in an error of approximately one foot.

Referring back to FIG. 1, in some demonstrative embodiments, device 110 may utilize information ("ToF accuracy information") relating to an accuracy of ToF measurements in a location area, to increase an accuracy of ToF measurements performed at the location area and, accordingly, to improve the estimation of the location of device 110.

In some demonstrative embodiments, the ToF accuracy information may include information indicating if there is a LOS between device 110 and one or more other devices, at a location area of device 110, e.g., as described below.

In other embodiments, the ToF accuracy information may relate to any other parameter or attribute affecting an accuracy of the ToF measurement, e.g., at the location area.

In some demonstrative embodiments, wireless communication units 112 and/or 122 may communicate ToF accuracy information corresponding to a location area.

In some demonstrative embodiments, the ToF accuracy information may include at least one accuracy indicator corresponding to at least one wireless communication device.

In some demonstrative embodiments, the accuracy indicator may indicate an accuracy of a ToF measurement at the location area with the wireless communication device.

In some demonstrative embodiments, server 120 may provide the ToF accuracy information to device 110.

In some demonstrative embodiments, server 120 may store location based ToF accuracy information including ToF accuracy information corresponding to a plurality of location areas.

In some demonstrative embodiments, the location based ToF accuracy information stored in server 120 may correspond to a relatively large area, for example, an area having a size of tens or hundreds of square meters, e.g., a building, a mall, and the like. The ToF accuracy information of a location area may correspond to a relatively small area, for example, an area having a size of a few square centimeters or meters, e.g., a room, a store, a floor tile, a square meter, a square centimeter and/or the like.

For example, server 120 may store location based ToF accuracy information of the indoor location, e.g., the mall, the building and/or the like, including ToF accuracy information of a plurality of location areas within the indoor location, e.g., square meters or stores inside the mall, offices, rooms or areas inside a building, and/or the like.

In some demonstrative embodiments, the ToF accuracy information of a location area of the location areas may include one or more accuracy indicators indicating an accuracy of one or more TOF measurements at the location area with one or more nodes. For example, the ToF accuracy information of a location area may include an indicator of an accuracy of a ToF measurement performed at the location area with node 150, an indicator of an accuracy of a ToF measurement performed at the location area with node 160, an indicator of an accuracy of a ToF measurement performed at the location area with node 140, and/or one or more other indicators of an accuracy of one or more other ToF measurement performed at the location area with one or more other nodes.

In some demonstrative embodiments, the ToF accuracy information of a location area may include one or more accuracy indicators indicating an accuracy of one or more ToF measurements at the location area with one or more nodes, which are within a predefined distance from the location area.

For example, the ToF accuracy information of a location area may include one or more indicators with respect to one or nodes within a distance of one hundred meters, or any other distance, from the location area and/or within the same region of the location area.

In one example, the ToF accuracy information of a store within a mall may include accuracy indicators of one or more ToF measurements at the store with one or more APs within the mall. In another example, ToF accuracy information of a room within a building may include accuracy indicators of one or more ToF measurements at the room with one or more APs within the building.

In some demonstrative embodiments, the predefined distance may be determined according to properties of WM 103. For example, the predefined distance may include a maximum propagation distance of a wireless communication signal over WM 103, e.g., without substantially any path loss.

In some demonstrative embodiments, the accuracy indicators corresponding to a location area may indicate an existence of a LOS at the location area with one or more nodes. For example, the accuracy indicators of the location area may include an indication of a LOS with node 150, an indication of a LOS with node 140, and/or one or more other indications of a LOS with one or more other nodes.

In some demonstrative embodiments, the accuracy indicators may indicate whether or not there is a LOS at the location area with the one or more nodes. For example, an accuracy indicator at a location area may indicate whether or not there is a LOS to node 140, node 150, node 160 or any other node. In other embodiments, the accuracy indicators may indicate any other indication with respect to LOS and/or an accuracy of ToF measurements at the location area with one or more nodes. For example, an accuracy indicator at a location area may indicate an accuracy level of a ToF measurement performed at the location area with node 140, node 150, node 160 and/or any other node.

In some demonstrative embodiments, the location based ToF accuracy information may be structured as a map layer. For example, the map may include a map of the indoor location, e.g., a map of a building, a mall, a street, an area and/or the like. A location area may include a location, e.g., a point, and/or a zone on the map, e.g., an area bound by coordinates on the map, a square meter, a tile of the map, a room, and/or the like. The location based ToF accuracy information may be structured, for example, such that a location and/or zone on the map may include, may be linked to and/or associated with, one or more accuracy indicators indicating a ToF measurement accuracy and/or existence of a LOS with one or more nodes within the predefined distance from the location area and/or the zone.

In some demonstrative embodiments, server 120 may include a database 124 to store the location based ToF accuracy information corresponding to a plurality of location areas.

In some demonstrative embodiments, device 110 may include a location estimator 116 configured to estimate a location of device 110.

In some demonstrative embodiments, location estimator 116 may control wireless communication unit 112 to transmit to server 120 a request for ToF accuracy information corresponding to a location area of device 110.

In some demonstrative embodiments, the request from device 110 may indicate the location area of device 110. For example, the request may indicate a point on a map, coordinates on the map, an area on the map, a room in a building, a store in a mall and/or the like, at which device 110 is assumed to be located.

In one example, location estimator 116 may estimate the location area of device 110 based on a previously estimated location area of device 110, e.g., a GPS fix position and/or the like.

In another example, location estimator 116 may estimate the location area of device 110 based on an estimation of a location of device 110, e.g., an estimation having a relatively low accuracy level, for example, an accuracy level of ten meters.

In a further example, location estimator 116 may estimate the location area of device 110 based on any other suitable method.

In some demonstrative embodiments, the request may indicate one or more nodes, e.g., nodes 140, 150 and/or 160, which may be in communication with device 110. In other embodiments, the request may not indicate the one or more nodes.

In some demonstrative embodiments, wireless communication unit 122 may receive the request from device 110.

In some demonstrative embodiments, server 120 may include a processor 126 to process the request and to prepare a response to device 110.

In some demonstrative embodiments, processor 126 may retrieve from database 124 ToF accuracy information corresponding to the location area of device 110, e.g., as indicated by the request. For example, the ToF accuracy information may include ToF accuracy information corresponding to the point on a map, the coordinates on the map, the area on the map, the room in a building, the store in a mall and/or the like.

In some demonstrative embodiments, the ToF accuracy information may include one or more accuracy indicators with respect to the location area.

In some demonstrative embodiments, an accuracy indicator may indicate an accuracy level of a ToF measurement at the location area of device 110 with a node ("accuracy level of the node").

For example, the accuracy indicators may indicate an accuracy level of one or more ToF measurements at the location area of device 110 with node 140, node 150, node 160, and/or one or more other nodes.

In some demonstrative embodiments, the accuracy indicators may indicate an existence of LOS from the location area of device 110 to node 140, node 150, node 160 and/or one or more other nodes.

In some demonstrative embodiments, wireless communication unit 122 may transmit to device 110 a response including the ToF accuracy information, and wireless communication unit 112 may receive the response from server 120.

In some demonstrative embodiments, location estimator 116 may estimate a location of device 110 based on the ToF accuracy information received from server 120, e.g., as described below.

In one example, the ToF accuracy information corresponding to the location area of device 110 may include a first accuracy indicator corresponding to node 140, a second accuracy indicator corresponding to node 150, a third accuracy indicator corresponding to node 160, and/or one or more other accuracy indicators corresponding to one or more other nodes.

In some demonstrative embodiments, location estimator 116 may select to perform a ToF measurement with a node based on the accuracy level of the node. For example, location estimator 116 may perform a ToF measurement with a node, for example, if the accuracy level of the node is greater than a predefined threshold.

In one example, location estimator 116 may select to perform a ToF measurement with a node having an accuracy indicator indicating a relatively increased accuracy level of the node, e.g., compared to an accuracy level of another node.

In another example, location estimator 116 may not perform a ToF measurement with a node having an accuracy indicator indicating a relatively low accuracy level of the node, e.g., compared to an accuracy level of another node.

In some demonstrative embodiments, location estimator 116 may assign a weight to a ToF measurement with a node based on the accuracy level of the node at the location area.

For example, location estimator 116 may assign a first weight to a ToF measurement with node 140 and a second, e.g., greater, weight to a ToF measurement with node 150, for example, if the accuracy indicator of node 150 indicates a greater accuracy level of node 150 compared to the accuracy level of node 140.

In some demonstrative embodiments, location estimator 116 may estimate the location of device 110 based on the weights. For example, location estimator 116 may utilize the weights when performing a trilateration procedure to estimate the location of device 110, e.g., by applying a weighted average to the ToF measurements with the nodes.

In some demonstrative embodiments, location estimator 116 may select one or more nodes to perform ToF measurements based on the accuracy indicators corresponding to the nodes, and may estimate a location of mobile device 110 based on the weights assigned to the selected nodes, e.g., utilizing a weighted least squares method, or any other weighted average method.

For example, location estimator 116 may select to perform ToF measurements with nodes 140 and 150, for example, based on the accuracy level of nodes 140, 150 and 160. Location estimator 116 may assign weights to the ToF measurements with nodes 140 and 150, e.g., based on the accuracy level of nodes 140 and 150, and may calculate the estimate location of device 110, e.g., by performing trilateration based on the weights.

In some demonstrative embodiments, location estimator 116 may select to perform a ToF measurement with a node based on whether an accuracy indicator of the node indicates an existence or non-existence of a LOS with the node at the location area.

In some demonstrative embodiments, location estimator 116 may select to perform a ToF measurement with a node, e.g., only if an accuracy indicator of the node indicates an existence of a LOS with the node at the location area.

For example, device 110 may perform ToF measurements with nodes 140 and 150, e.g., while excluding node 160, for example, if the first and the second accuracy indicators indicate an existence of a LOS to nodes 140 and 150, and the third accuracy indicator indicates non-existence of a LOS to node 160.

In another example, device 110 may perform ToF measurements with nodes 150 and 160, e.g., while excluding node 140, for example, if the second and the third accuracy indicators indicate an existence of a line of sight to nodes 150 and 160, and the first accuracy indicator indicates non-existence of a LOS to node 140.

In some demonstrative embodiments, location estimator 116 may estimate the location of device 110 based on the ToF measurements performed with the nodes having a LOS with device 110. For example, location estimator 116 may utilize only nodes having a LOS with device 110 for the trilateration method.

In some demonstrative embodiments, location estimator 116 may estimate the location of device 110 based on the ToF measurements performed with both nodes having a LOS with device 110 as well as nodes not having a LOS with device 110. For example, location estimation 116 may assign different weights to the ToF measurements with nodes 140, 150 and/or 160, e.g., based on the existence or non-existence of a LOS to nodes 140, 150 and/or 160.

In some demonstrative embodiments, location estimator 116 may assign a first weight to ToF measurements with nodes having a LOS to the location area, and may assign a second, e.g., lesser, weight to ToF measurements with nodes not having a LOS to the location area.

For example, location estimator 116 may assign a first weight to a ToF measurement with node 140 and a second, e.g., lesser, weight to a ToF measurement with node 150, for example, if the first accuracy indicator indicates an existence of a LOS to node 140 and the second accuracy indicator indicates non-existence of a LOS to node 150.

In some demonstrative embodiments, location estimator 116 may assign one or more first weights to ToF measurements with first nodes having a LOS to the location area, and may assign one or more second weights, e.g., lesser than the first weights to ToF measurements with second nodes not having a LOS to the location area. In some demonstrative embodiments, the second weights may be determined based on the accuracy level of the second nodes.

For example, location estimator 116 may assign a first weight to a ToF measurement with node 140, a second weight, e.g., greater than the first weight, to a ToF measurement with node 150, and a third weight, e.g., greater than the first weight and the second weight, to a ToF measurement with node 160, for example, if the accuracy indicator of node 140 indicates non-existence of a LOS to node 140 and a first accuracy level, the accuracy indicator of node 150 indicates non-existence of a LOS to node 150 and a second accuracy level, e.g., greater than the first accuracy level, and the accuracy indicator of node 160 indicates an existence of a LOS to node 160.

In some demonstrative embodiments, location estimator 116 may estimate the location of device 110 based on the weights assigned to the ToF measurements with the nodes having a LOS with the location area, and the weights assigned to the ToF measurements with the nodes not having a LOS with the location area.

In one example, location estimator 116 may select to perform ToF measurements with nodes 140, 150 and 160, for example, based on the existence of LOS to nodes 140 and 150 and on the accuracy level of node 160. Location estimator 116 may perform ToF measurements with nodes 140, 150 and 160, and may assign a higher weight to the ToF measurements with node 140 and 150, e.g., based on the existence of LOS to the nodes, and a lower weight to the ToF measurement with node 160, e.g., based on the accuracy level of node 160. Location estimator 116 may calculate the location of device 110, e.g., by performing trilateration of the ToF measurements based on the weights.

In some demonstrative embodiments, location estimator 116 may estimate the location of device 110 based on any other calculation utilizing the ToF accuracy information relating to the existence of a LOS to a node and/or the accuracy level of the node.

In some demonstrative embodiments, performing ToF measurements based on the ToF accuracy information may improve performance of device 110. For example, device 110 may estimate the location of device 110 with an increased accuracy, e.g., based on the ToF accuracy information.

In some demonstrative embodiments, performing ToF measurements based on the ToF accuracy information may improve power consumption of device 110. For example, device 110 may perform a reduced number of ToF measurements, e.g., by performing ToF only with a selected number of nodes, for example, only with nodes having a relatively high level of accuracy and/or having a LOS with device 110.

In some demonstrative embodiments, server 120 may utilize information from one or more mobile devices to create the location based ToF accuracy information. For example, server 120 may utilize a "crowd sourcing" method, e.g., as described below.

In some demonstrative embodiments, a mobile device may transmit to server 120 ToF accuracy information including an accuracy indicator indicating an accuracy of a ToF measurement performed by the mobile device at a location area of the mobile device with one or more nodes.

In some demonstrative embodiments, the ToF accuracy information may indicate the location area of the device, the one or more nodes with which the ToF measurements were performed, and the ToF accuracy information corresponding to the indicated node at the indicated location area.

In some demonstrative embodiments, server 120 may receive the ToF accuracy information from the mobile device, and may update the location based ToF accuracy information at the location area indicated by the mobile device.

For example, wireless communication unit 112 may transmit to server 120 ToF accuracy information indicating a location area of device 110, e.g., a room in a building, and one or more accuracy indicators indicating an accuracy of one or more ToF measurements performed by device 110 at the location area with one or more nodes, e.g., nodes 140, 150 and/or 160.

In some demonstrative embodiments, server 120 may include a map in database 124 including the location area of device 110, e.g., a map of the building. Server 120 may receive the ToF accuracy information, and may update the location based ToF accuracy information. For example, server 120 may update the accuracy indicators of the room in the map based on the ToF measurements performed by device 110 at the room with nodes 140, 150 and/or 160.

In one example, server 120 may update the room in the map to include, and/or to be linked to or associated with, accuracy indicators indicating a relatively high level of accuracy of a ToF measurement with nodes 140 and 150, and a relatively low level of accuracy of a ToF measurement with node 160, for example, if the ToF measurements performed by device 110 at the room with node 140, 150 and 160 indicate a high level of accuracy of a ToF measurement with nodes 140 and 150 and a low level of accuracy of a ToF measurement with node 160.

In another example, server 120 may update the room in the map to include, and/or to be linked to or associated with, accuracy indicators indicating an existence of a LOS to nodes 140 and 150, for example, if the ToF measurements performed by device 110 at the room with nodes 140 and 150 indicate an existence of a LOS with nodes 140 and 150.

In some demonstrative embodiments, location estimator 116 may determine whether or not there is a LOS to a node based on measurement residuals with respect to the node.

In one example, device 110 may compare ToF ranges calculated by the ToF measurements between nodes 140, 150, and 160, with actual ranges of nodes 140, 150 and 160. Device 110 may determine an existence of a LOS to nodes 140, 150 and 160, for example, if the difference between the ToF ranges and the actual ranges is relatively negligible.

In some demonstrative embodiments, device 110 may determine whether or not there is a LOS to a node based on any other technique, e.g., as described below with reference to FIGS. 3A, 3B and/or 3C.

Figure 3A:
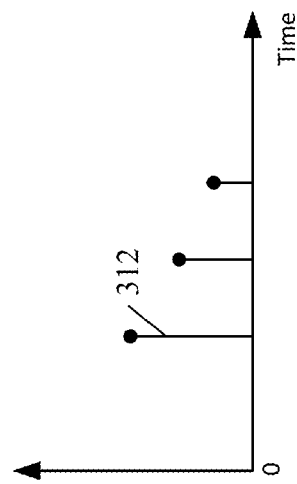
FIGS. 3A, 3B and 3C are schematic illustrations of three graphs depicting amplitudes and time delays of propagation paths between a mobile device and a node in three different situations, in accordance with some demonstrative embodiments.
Figure 3B:
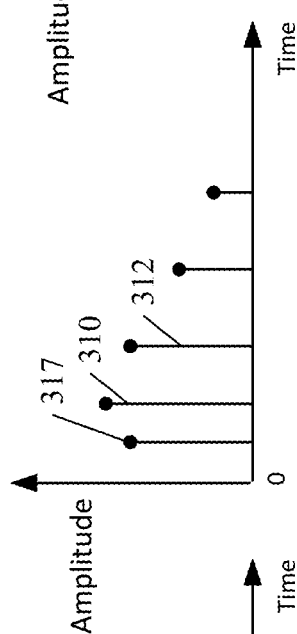

Reference is made to FIGS. 3A, 3B and/or 3C, which schematically illustrate graphs depicting amplitudes and time delays of propagation paths between a mobile device, e.g., device 110 (FIG. 1), and a node, e.g., node 140, node 150 or node 160 (FIG. 1), in three different situations, in accordance with some demonstrative embodiments.

In some demonstrative embodiments, the mobile device and the node may be within an indoor location, and the mobile device may be navigating within the indoor location.

As shown in FIG. 3A, propagation paths between the mobile device and the node in a first situation, e.g., at a first time and at a first location within the indoor location, may include four paths, e.g., a path 310, a path 312, a path 314, and/or a path 316. A component of a wireless communication signal received by the mobile device may be received via a path of the four paths and may have a propagation time, e.g., as measured by a ToF measurement between the mobile device and the node, and an amplitude, e.g., as received by the mobile device.

As shown in FIG. 3A, path 310 may be the path having the shortest propagation time, and the highest amplitude, e.g., compared to paths 312, 314 and/or 316, in the first situation.

As shown in FIG. 3B, a path 317 may appear at a second situation, for example, at a second time, e.g., greater than the first time, and at a second location, e.g., different from the first location. For example, path 317 may appear due to movement of the mobile device within the indoor location from the first location to the second location.

As shown in FIG. 3B, path 317 may have a shorter propagation time compared to the propagation time of path 310. Accordingly, location estimator 116 (FIG. 1) may determine that path 310 is not a LOS path between the mobile device and the node.

In some demonstrative embodiments, location estimator 116 (FIG. 1) may determine that path 317 is a LOS path between the mobile device and the node, for example, if any other path does not appear to have a propagation time shorter than the propagation time of path 317.

Figure 3C:
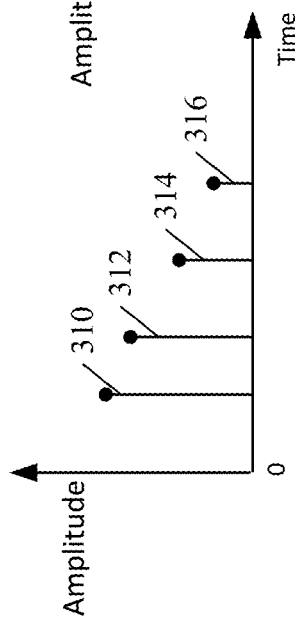

As shown in FIG. 3C, path 317 may disappear at a third situation, for example, at a third time, e.g., different from the first time and the second time, and at a third location, e.g., different from the first location and the second location. For example, path 317 may disappear due to movement of the mobile device from the second location to the third location, in which a LOS to the node may be blocked, and the mobile device may receive a signal via path 312. Accordingly, location estimator 116 (FIG. 1) may determine that there is no LOS to the node, e.g., since path 317 may not exist, between the mobile device and the node at the third location.

In some demonstrative embodiments, the mobile device may transmit to server 120 (FIG. 1) the ToF accuracy information including accuracy indicators indicating the existence of the LOS with the node at the second location and the non-existence of the LOS with the node at the first location and at the third location. Accordingly, server 120 (FIG. 1) may update the map layer in database 124 (FIG. 1) to indicate that the first location does not have a LOS to the node, the second location has a LOS to the node, and the third location does not have a LOS to the node.

Figure 4:
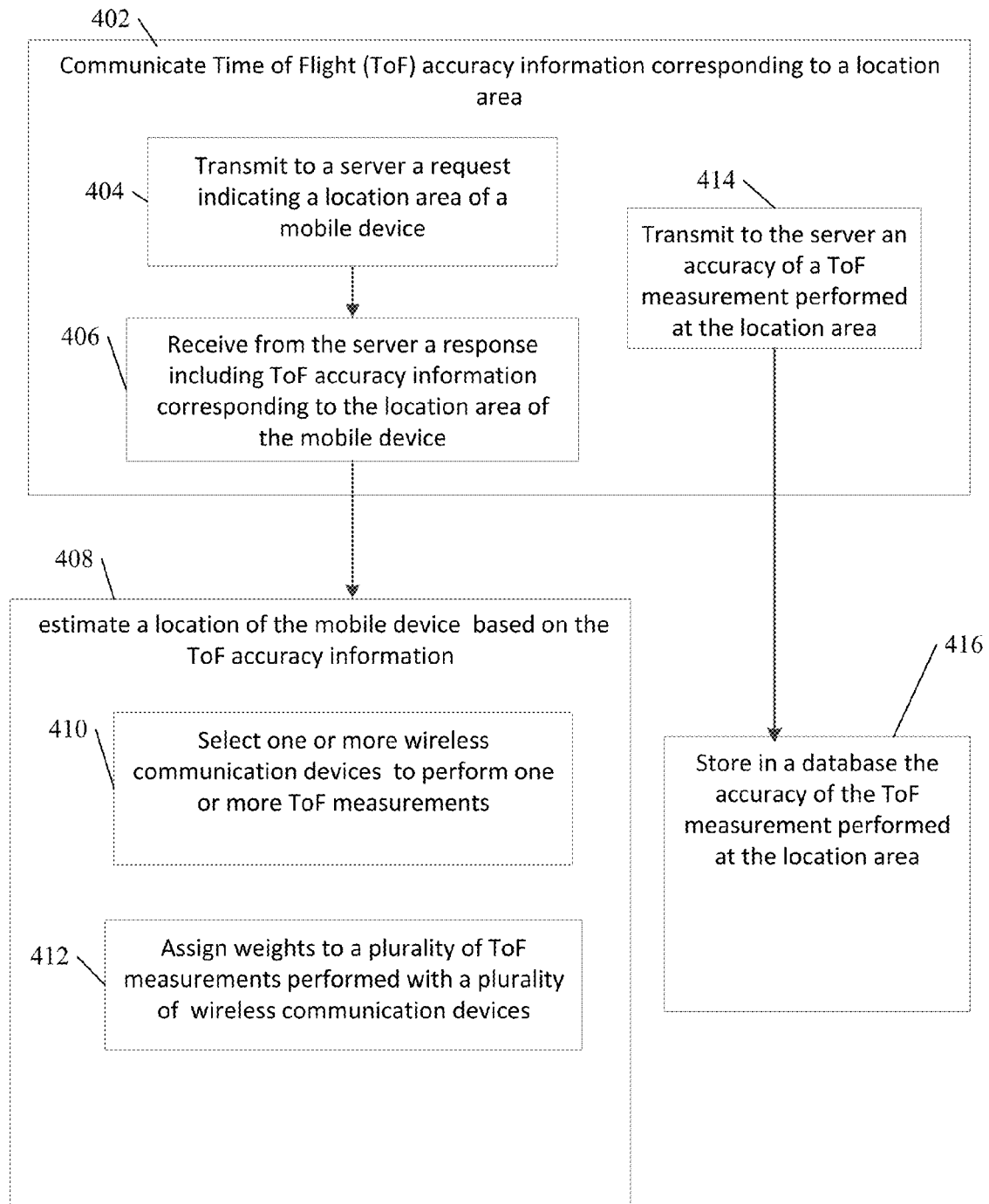
FIG. 4 is a schematic illustration of a method of estimating a location of a mobile device, in accordance with some demonstrative embodiments.

Reference is made to FIG. 4, which schematically illustrates a method of estimating a location of a mobile device, in accordance with some demonstrative embodiments. In some demonstrative embodiments, one or more of the operations of the method of FIG. 4 may be performed by any suitable wireless communication system, e.g., system 100 (FIG. 1), a mobile device, e.g., device 110 (FIG. 1), a server, e.g., server 120 (FIG. 1) and/or a wireless communication unit, e.g., wireless communication units 112 and/or 122 (FIG. 1).

As indicated at block 402, the method may include communicating ToF accuracy information corresponding to a location area. For example, wireless communication units 112 and 122 (FIG. 1) may communicate ToF accuracy information corresponding to the location area of mobile device 110 (FIG. 1), e.g., as described above.

As indicated at block 404, communicating the ToF accuracy information may include transmitting to a server a request indicating a location area of a mobile device. For example, wireless communication unit 112 (FIG. 1) may transmit the request to server 120 (FIG. 1) indicating the location area of mobile device 110 (FIG. 1), e.g., as described above.

As indicated at block 406, communicating the ToF accuracy information may include receiving from the server a response including the ToF accuracy information corresponding to the location area of the mobile device. For example, device 110 (FIG. 1) may receive from server 120 (FIG. 1) the ToF accuracy information corresponding to the location area of mobile device 110 (FIG. 1), e.g., as described above.

As indicated at block 414, communicating the ToF accuracy information may include transmitting to the server an accuracy of a ToF measurement performed at the location area. For example, wireless communication unit 112 (FIG. 1) may transmit to server 120 (FIG. 1) the accuracy of a ToF measurement performed with nodes 140, 150 and/or 160 (FIG. 1) at the location area of device 110 (FIG. 1), e.g., as described above.

As indicated at block 408, the method may include estimating a location of the mobile device based on the ToF accuracy information. For example, location estimator 116 (FIG. 1) may estimate the location of mobile device 110 (FIG. 1) based on the ToF accuracy information, e.g., as described above.

As indicated at block 410, estimating the location of the mobile device may include selecting one or more wireless communication devices to perform one or more ToF measurements based on the ToF accuracy information. For example, location estimator 116 (FIG. 1) may select one or more of nodes 140, 150 and/or 160 (FIG. 1) to perform the one or more ToF measurements based on the ToF accuracy information, e.g., as described above.

As indicated at block 412, estimating the location of the mobile device may include assigning weights to a plurality of ToF measurements performed with a plurality of wireless communication devices based on the ToF accuracy information. For example, location estimator 116 (FIG. 1) may assign weights to the plurality of ToF measurements performed with nodes 140, 150 and/or 160 (FIG. 1) based on the ToF accuracy information, e.g., as described above.

As indicated at block 416, the method may include storing in a database the accuracy of the ToF measurement performed at the location area. For example, server 120 (FIG. 1) may store in database 124 (FIG. 1) the accuracy of the ToF measurement performed between device 110 (FIG. 1) and node 140, 150 or 160 (FIG. 1), e.g., as described above.

Figure 5:
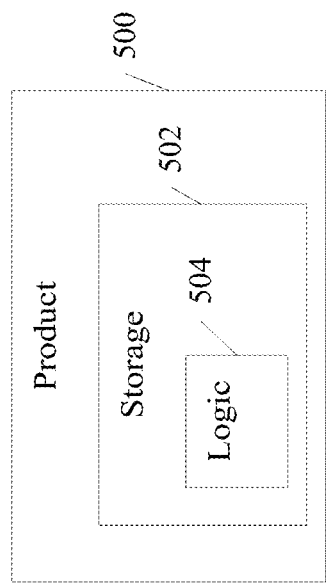
FIG. 5 is a schematic illustration of an article of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 110 (FIG. 1), wireless communication unit 112 (FIG. 1), wireless communication unit 122 (FIG. 1), server 120 (FIG. 1), location estimator 116 (FIG. 1) and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a wireless communication unit to communicate Time of Flight (ToF) accuracy information corresponding to a location area, the ToF accuracy information includes at least one accuracy indicator corresponding to at least one wireless communication device, the accuracy indicator indicates an accuracy of a ToF measurement at the location area with the wireless communication device.

Example 2 includes the subject matter of Example 1 and optionally, wherein the wireless communication unit is to receive the ToF accuracy information.

Example 3 includes the subject matter of Example 2 and optionally, wherein the wireless communication unit is to receive the ToF accuracy information from a server based on a location area of the apparatus.

Example 4 includes the subject matter of Example 3 and optionally, wherein the wireless communication unit is to transmit to the server a request indicating the location area of the apparatus, and to receive from the server a response including the ToF accuracy information corresponding to the location area of the apparatus.

Example 5 includes the subject matter of any one of Examples 2-4 and optionally, wherein the wireless communication unit is to estimate a location of the apparatus based on the ToF accuracy information corresponding to the location area.

Example 6 includes the subject matter of any one of Examples 2-5 and optionally, wherein the wireless communication unit is to perform a ToF measurement with the wireless communication device based on the accuracy indicator of the wireless communication device.

Example 7 includes the subject matter of any one of Examples 2-6 and optionally, wherein the at least one wireless communication device includes a plurality of wireless communication devices, and wherein the ToF accuracy information includes a plurality of accuracy indicators corresponding to the plurality of wireless communication devices.

Example 8 includes the subject matter of Example 7 and optionally, wherein the wireless communication unit is to assign weights to a plurality of ToF measurements performed with the plurality of wireless communication devices based on the plurality of accuracy indicators.

Example 9 includes the subject matter of Example 8 and optionally, wherein the wireless communication unit is to determine an estimated location of the apparatus based on the weights.

Example 10 includes the subject matter of any one of Examples 7-9 and optionally, wherein the wireless communication unit is to select one or more wireless communication devices of the plurality of the wireless communication devices to perform one or more ToF measurements based on the plurality of accuracy indicators.

Example 11 includes the subject matter of Example 1 and optionally, wherein the wireless communication unit is to transmit the ToF accuracy information.

Example 12 includes the subject matter of Example 11 and optionally, wherein the accuracy indicator indicates an accuracy of a ToF measurement performed by the wireless communication unit at the location area with the wireless communication device.

Example 13 includes the subject matter of Example 1 and optionally, wherein the wireless communication unit is to transmit the ToF accuracy information to at least one mobile device based on a location area of the mobile device.

Example 14 includes the subject matter of Example 13 and optionally, wherein the wireless communication unit is to receive from the mobile device a request indicating the location area of the mobile device, and to transmit to the mobile device a response including the ToF accuracy information corresponding to the location area.

Example 15 includes the subject matter of Example 1 and optionally, wherein the wireless communication unit is to receive the ToF accuracy information from a mobile device, wherein the accuracy indicator indicating an accuracy of a ToF measurement performed by the mobile device at the location area with the wireless communication device.

Example 16 includes the subject matter of Example 15 and optionally, wherein the apparatus includes a database to store the ToF accuracy information received from the mobile device.

Example 17 includes the subject matter of Example 16 wherein the database is to store location based ToF accuracy information including ToF accuracy information corresponding to a plurality of location areas.

Example 18 includes the subject matter of any one of Examples 1-17 and optionally, wherein the accuracy indicator includes a Line of Sight (LOS) indicator indicating an existence or non-existence of a LOS between the location and the wireless communication device.

Example 19 includes the subject matter of any one of Examples 1-18 and optionally, wherein the wireless communication device includes an access point (AP).

Example 20 includes a system of wireless communication, the system comprising at least one wireless communication device including an antenna; and a wireless communication unit to communicate via the antenna Time of Flight (ToF) accuracy information corresponding to a location area, the ToF accuracy information includes at least one accuracy indicator corresponding to at least one wireless communication node, the accuracy indicator indicates an accuracy of a ToF measurement at the location area with the wireless communication node.

Example 21 includes the subject matter of Example 20 and optionally, wherein the wireless communication device comprises a mobile device, and wherein the wireless communication unit is to receive the ToF accuracy information.

Example 22 includes the subject matter of Example 21 and optionally, wherein the wireless communication unit is to receive the ToF accuracy information from a server based on a location area of the mobile device.

Example 23 includes the subject matter of Example 22 and optionally, wherein the wireless communication unit is to transmit to the server a request indicating the location area of the mobile device, and to receive from the server a response including the ToF accuracy information corresponding to the location area of the mobile device.

Example 24 includes the subject matter of any one of Examples 21-23 and optionally, wherein the wireless communication unit is to estimate a location of the mobile device based on the ToF accuracy information corresponding to the location area.

Example 25 includes the subject matter of any one of Examples 21-24 and optionally, wherein the wireless communication unit is to perform a ToF measurement with the wireless communication node based on the accuracy indicator of the wireless communication node.

Example 26 includes the subject matter of any one of Examples 21-25 and optionally, wherein the at least one wireless communication node includes a plurality of wireless communication nodes, and wherein the ToF accuracy information includes a plurality of accuracy indicators corresponding to the plurality of the wireless communication nodes.

Example 27 includes the subject matter of Example 26 and optionally, wherein the wireless communication unit is to assign weights to a plurality of ToF measurements performed with the plurality of the wireless communication nodes based on the plurality of accuracy indicators.

Example 28 includes the subject matter of Example 27 and optionally, wherein the wireless communication unit is to determine an estimated location of the mobile device based on the weights.

Example 29 includes the subject matter of any one of Examples 26-28 and optionally, wherein the wireless communication unit is to select one or more wireless communication nodes of the plurality of the wireless communication nodes to perform one or more ToF measurements based on the plurality of accuracy indicators.

Example 30 includes the subject matter of Example 20 and optionally, wherein the wireless communication unit is to transmit the ToF accuracy information.

Example 31 includes the subject matter of Example 30 and optionally, wherein the accuracy indicator indicates an accuracy of a ToF measurement performed by the wireless communication unit at the location area with the wireless communication node.

Example 32 includes the subject matter of Example 20 and optionally, wherein the wireless communication device comprises a server, and wherein the wireless communication unit is to transmit the ToF accuracy information to at least one mobile device based on a location area of the mobile device.

Example 33 includes the subject matter of Example 32 and optionally, wherein the wireless communication unit is to receive from the mobile device a request indicating the location area of the mobile device, and to transmit to the mobile device a response including the ToF accuracy information corresponding to the location area.

Example 34 includes the subject matter of Example 20 and optionally, wherein the wireless communication device comprises a server, wherein the wireless communication unit is to receive the ToF accuracy information from a mobile device, and wherein the accuracy indicator indicating an accuracy of a ToF measurement performed by the mobile device at the location area with the wireless communication node.

Example 35 includes the subject matter of Example 34 and optionally, wherein the server includes a database to store the ToF accuracy information received from the mobile device.

Example 36 includes the subject matter of Example 35 wherein the database is to store location based ToF accuracy information including ToF accuracy information corresponding to a plurality of location areas.

Example 37 includes the subject matter of any one of Examples 20-36 and optionally, wherein the accuracy indicator includes a Line of Sight (LOS) indicator indicating an existence or non-existence of a LOS between the location area and the wireless communication node.

Example 38 includes the subject matter of any one of Examples 20-37 and optionally, wherein the wireless communication node includes an access point (AP).

Example 39 includes a method of wireless communication, the method comprising communicating Time of Flight (ToF) accuracy information corresponding to a location area, the ToF accuracy information includes at least one accuracy indicator corresponding to at least one wireless communication node, the accuracy indicator indicates an accuracy of a ToF measurement at the location area with the wireless communication node.

Example 40 includes the subject matter of Example 39 and optionally comprising receiving the ToF accuracy information.

Example 41 includes the subject matter of Example 40 and optionally comprising receiving the ToF accuracy information from a server based on the location area.

Example 42 includes the subject matter of Example 41 and optionally comprising transmitting to the server a request indicating the location area, and receiving from the server a response including the ToF accuracy information corresponding to the location area.

Example 43 includes the subject matter of any one of Examples 40-42 and optionally comprising estimating a location based on the ToF accuracy information corresponding to the location area.

Example 44 includes the subject matter of any one of Examples 40-43 and optionally comprising performing a ToF measurement with the wireless communication node based on the accuracy indicator of the wireless communication node.

Example 45 includes the subject matter of any one of Examples 40-44 and optionally, wherein the at least one wireless communication node includes a plurality of wireless communication nodes, and wherein the ToF accuracy information includes a plurality of accuracy indicators corresponding to the plurality of the wireless communication nodes.

Example 46 includes the subject matter of Example 45 and optionally comprising assigning weights to a plurality of ToF measurements performed with the plurality of the wireless communication nodes based on the plurality of accuracy indicators.

Example 47 includes the subject matter of Example 46 and optionally comprising determining an estimated location based on the weights.

Example 48 includes the subject matter of any one of Examples 45-47 and optionally comprising selecting one or more wireless communication nodes of the plurality of the wireless communication nodes to perform one or more ToF measurements based on the plurality of accuracy indicators.

Example 49 includes the subject matter of Example 39 and optionally comprising transmitting the ToF accuracy information.

Example 50 includes the subject matter of Example 49 and optionally, wherein the accuracy indicator indicates an accuracy of a ToF measurement performed at the location area with the wireless communication node.

Example 51 includes the subject matter of Example 39 and optionally comprising transmitting the ToF accuracy information to at least one mobile device based on a location area of the mobile device.

Example 52 includes the subject matter of Example 51 and optionally comprising receiving from the mobile device a request indicating the location area of the mobile device, and transmitting to the mobile device a response including the ToF accuracy information corresponding to the location area.

Example 53 includes the subject matter of Example 39 and optionally comprising receiving the ToF accuracy information from a mobile device, wherein the accuracy indicator indicating an accuracy of a ToF measurement performed by the mobile device at the location area with the wireless communication node.

Example 54 includes the subject matter of Example 53 and optionally comprising storing the ToF accuracy information in a database.

Example 55 includes the subject matter of Example 54 and optionally comprising storing in the database location based ToF accuracy information including ToF accuracy information corresponding to a plurality of location areas.

Example 56 includes the subject matter of any one of Examples 39-55 and optionally, wherein the accuracy indicator includes a Line of Sight (LOS) indicator indicating an existence or non-existence of a LOS between the location area and the wireless communication node.

Example 57 includes the subject matter of any one of Examples 39-56 and optionally, wherein the wireless communication node includes an access point (AP).

Example 58 includes a product including a non-transitory storage medium having stored thereon instructions that, when executed by a machine, result in communicating Time of Flight (ToF) accuracy information corresponding to a location area, the ToF accuracy information includes at least one accuracy indicator corresponding to at least one wireless communication node, the accuracy indicator indicates an accuracy of a ToF measurement at the location area with the wireless communication node.

Example 59 includes the subject matter of Example 58 and optionally, wherein the instructions result in receiving the ToF accuracy information.

Example 60 includes the subject matter of Example 59 and optionally, wherein the instructions result in receiving the ToF accuracy information from a server based on the location area.

Example 61 includes the subject matter of Example 60 and optionally, wherein the instructions result in transmitting to the server a request indicating the location area, and receiving from the server a response including the ToF accuracy information corresponding to the location area.

Example 62 includes the subject matter of any one of Examples 59-61 and optionally, wherein the instructions result in estimating a location based on the ToF accuracy information corresponding to the location area.

Example 63 includes the subject matter of any one of Examples 59-62 and optionally, wherein the instructions result in performing a ToF measurement with the wireless communication node based on the accuracy indicator of the wireless communication node.

Example 64 includes the subject matter of any one of Examples 59-63 and optionally, wherein the at least one wireless communication node includes a plurality of wireless communication nodes, and wherein the ToF accuracy information includes a plurality of accuracy indicators corresponding to the plurality of the wireless communication nodes.

Example 65 includes the subject matter of Example 64 and optionally, wherein the instructions result in assigning weights to a plurality of ToF measurements performed with the plurality of the wireless communication nodes based on the plurality of accuracy indicators.

Example 66 includes the subject matter of Example 65 and optionally, wherein the instructions result in determining an estimated location based on the weights.

Example 67 includes the subject matter of any one of Examples 64-66 and optionally, wherein the instructions result in selecting one or more wireless communication nodes of the plurality of the wireless communication nodes to perform one or more ToF measurements based on the plurality of accuracy indicators.

Example 68 includes the subject matter of Example 58 and optionally, wherein the instructions result in transmitting the ToF accuracy information.

Example 69 includes the subject matter of Example 68 and optionally, wherein the accuracy indicator indicates an accuracy of a ToF measurement performed at the location area with the wireless communication node.

Example 70 includes the subject matter of Example 58 and optionally, wherein the instructions result in transmitting the ToF accuracy information to at least one mobile device based on a location area of the mobile device.

Example 71 includes the subject matter of Example 70 and optionally, wherein the instructions result in receiving from the mobile device a request indicating the location area of the mobile device, and transmitting to the mobile device a response including the ToF accuracy information corresponding to the location area.

Example 72 includes the subject matter of Example 58 and optionally, wherein the instructions result in receiving the ToF accuracy information from a mobile device, wherein the accuracy indicator indicating an accuracy of a ToF measurement performed by the mobile device at the location area with the wireless communication node.

Example 73 includes the subject matter of Example 72 and optionally, wherein the instructions result in storing the ToF accuracy information in a database.

Example 74 includes the subject matter of Example 73 and optionally, wherein the instructions result in storing in the database location based ToF accuracy information including ToF accuracy information corresponding to a plurality of location areas.

Example 75 includes the subject matter of any one of Examples 58-74 and optionally, wherein the accuracy indicator includes a Line of Sight (LOS) indicator indicating an existence or non-existence of a LOS between the location area and the wireless communication node.

Example 76 includes the subject matter of any one of Examples 58-75 and optionally, wherein the wireless communication node includes an access point (AP).

Example 77 includes an apparatus of wireless communication, the apparatus comprising means for communicating Time of Flight (ToF) accuracy information corresponding to a location area, the ToF accuracy information includes at least one accuracy indicator corresponding to at least one wireless communication node, the accuracy indicator indicates an accuracy of a ToF measurement at the location area with the wireless communication node.

Example 78 includes the subject matter of Example 77 and optionally comprising means for receiving the ToF accuracy information.

Example 79 includes the subject matter of Example 78 and optionally comprising means for receiving the ToF accuracy information from a server based on the location area.

Example 80 includes the subject matter of Example 79 and optionally comprising means for transmitting to the server a request indicating the location area, and receiving from the server a response including the ToF accuracy information corresponding to the location area.

Example 81 includes the subject matter of any one of Examples 78-80 and optionally comprising means for estimating a location based on the ToF accuracy information corresponding to the location area.

Example 82 includes the subject matter of any one of Examples 78-81 and optionally comprising means for performing a ToF measurement with the wireless communication node based on the accuracy indicator of the wireless communication node.

Example 83 includes the subject matter of any one of Examples 78-82 and optionally, wherein the at least one wireless communication node includes a plurality of wireless communication nodes, and wherein the ToF accuracy information includes a plurality of accuracy indicators corresponding to the plurality of the wireless communication nodes.

Example 84 includes the subject matter of Example 83 and optionally comprising means for assigning weights to a plurality of ToF measurements performed with the plurality of the wireless communication nodes based on the plurality of accuracy indicators.

Example 85 includes the subject matter of Example 84 and optionally comprising means for determining an estimated location based on the weights.

Example 86 includes the subject matter of any one of Examples 83-85 and optionally comprising means for selecting one or more wireless communication nodes of the plurality of the wireless communication nodes to perform one or more ToF measurements based on the plurality of accuracy indicators.

Example 87 includes the subject matter of Example 77 and optionally comprising means for transmitting the ToF accuracy information.

Example 88 includes the subject matter of Example 87 and optionally, wherein the accuracy indicator indicates an accuracy of a ToF measurement performed at the location area with the wireless communication node.

Example 89 includes the subject matter of Example 77 and optionally comprising means for transmitting the ToF accuracy information to at least one mobile device based on a location area of the mobile device.

Example 90 includes the subject matter of Example 89 and optionally comprising means for receiving from the mobile device a request indicating the location area of the mobile device, and transmitting to the mobile device a response including the ToF accuracy information corresponding to the location area.

Example 91 includes the subject matter of Example 77 and optionally comprising means for receiving the ToF accuracy information from a mobile device, wherein the accuracy indicator indicating an accuracy of a ToF measurement performed by the mobile device at the location area with the wireless communication node.

Example 92 includes the subject matter of Example 91 and optionally comprising means for storing the ToF accuracy information in a database.

Example 93 includes the subject matter of Example 92 and optionally comprising means for storing in the database location based ToF accuracy information including ToF accuracy information corresponding to a plurality of location areas.

Example 94 includes the subject matter of any one of Examples 77-93 and optionally, wherein the accuracy indicator includes a Line of Sight (LOS) indicator indicating an existence or non-existence of a LOS between the location area and the wireless communication node.

Example 95 includes the subject matter of any one of Examples 77-94 and optionally, wherein the wireless communication node includes an access point (AP).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a memory; and
   a wireless communication unit to communicate between a server and a mobile device Time of Flight (ToF) accuracy information corresponding to a location area, said ToF accuracy information includes a plurality of accuracy indicators corresponding to a plurality of wireless communication devices, an accuracy indicator of said plurality of accuracy indicators indicates an accuracy of a ToF measurement at said location area with a wireless communication device of said plurality of wireless communication devices, said accuracy indicator, which is communicated as part of the Tot accuracy information, includes Line of Sight (LOS) indicator to indicate whether or not a LOS exists between said location area and said wireless communication device.

2. The apparatus of claim 1, wherein said wireless communication unit is to receive said ToF accuracy information.

3. The apparatus of claim 2, wherein said wireless communication unit is to receive said ToF accuracy information from said server based on a location area of said mobile device.

4. The apparatus of claim 3, wherein said wireless communication unit is to transmit to said server a request indicating the location area of said mobile device, and to receive from said server a response including said ToF accuracy information corresponding to the location area of said mobile device.

5. The apparatus of claim 2, wherein said wireless communication unit is to estimate a location of said mobile device based on the ToF accuracy information corresponding to the location area.

6. The apparatus of claim 2, wherein said wireless communication unit is configured to perform one or more ToF measurements with said wireless communication device based on the accuracy indicator of said wireless communication device.

7. The apparatus of claim 2, wherein said wireless communication unit is to assign weights to a plurality of ToF measurements performed with the plurality of wireless communication devices based on the plurality of accuracy indicators.

8. The apparatus of claim 7, wherein said wireless communication unit is to determine an estimated location of the mobile device based on the weights.

9. The apparatus of claim 2, wherein said wireless communication unit is to select one or more wireless communication devices of the plurality of wireless communication devices to perform one or more ToF measurements based on the plurality of accuracy indicators.

10. The apparatus of claim 1, wherein said wireless communication unit is to transmit said ToF accuracy information.

11. The apparatus of claim 10, wherein said accuracy indicator indicates an accuracy of a ToF measurement performed by said wireless communication unit at said location area with said wireless communication device.

12. The apparatus of claim 10, wherein said apparatus includes a database to store said ToF accuracy information.

13. The apparatus of claim 12 wherein said database is to store location based ToF accuracy information including ToF accuracy information corresponding to a plurality of location areas.

14. The apparatus of claim 1, wherein said wireless communication unit is to transmit said ToF accuracy information to the mobile device based on a location area of the mobile device.

15. The apparatus of claim 14, wherein said wireless communication unit is to receive from said mobile device a request indicating the location area of said mobile device, and to transmit to said mobile device a response including said ToF accuracy information corresponding to the location area.

16. The apparatus of claim 1, wherein said wireless communication device includes an access point (AP).

17. A system comprising:
at least one wireless communication device including:
an antenna; and
a wireless communication unit to communicate between a server and a mobile device via the antenna Time of Flight (ToF) accuracy information corresponding to a location area, said ToF accuracy information includes a plurality of accuracy indicators corresponding to a plurality of wireless communication nodes, an accuracy indicator of said plurality of accuracy indicators indicates an accuracy of a ToF measurement at said location area with a wireless communication node of said plurality of wireless communication nodes, said accuracy indicator, which is communicated as part of the ToF accuracy information, includes a Line of Sight (LOS) indicator indicating whether or not a LOS exists between said location area and said wireless communication node.

18. The system of claim 17, wherein said wireless communication device comprises the mobile device, and wherein said wireless communication unit is to receive said ToF accuracy information.

19. The system of claim 18, wherein said wireless communication unit is configured to perform one or more ToF measurements with said wireless communication node based on the accuracy indicator of said wireless communication node.

20. The system of claim 17, wherein said wireless communication device comprises the server, and wherein said wireless communication unit is to transmit said ToF accuracy information to the mobile device based on a location area of the mobile device.

21. The system of claim 17, wherein said wireless communication device comprises the server, wherein said wireless communication unit is to receive the ToF accuracy information from the mobile device, and wherein said accuracy indicator indicating an accuracy of a ToF measurement performed by the mobile device at said location area with said wireless communication node.

22. A method comprising:
communicating between a server and a mobile device Time of Flight (ToF) accuracy information corresponding to a location area, said ToF accuracy information includes a plurality of accuracy indicators corresponding to a plurality of wireless communication nodes, an accuracy indicator of said plurality of accuracy indicators indicates an accuracy of a ToF measurement at said location area with a wireless communication node of said plurality of wireless communication nodes, said accuracy indicator, which is communicated as part of the ToF accuracy information, includes a Line of Sight (LOS) indicator indicating whether or not a LOS exists between said location area and said wireless communication node.

23. The method of claim 22 comprising receiving said ToF accuracy information from said server based on the location area.

24. The method of claim 22 comprising transmitting said ToF accuracy information to the mobile device based on a location area of the mobile device.

25. A product including a non-transitory storage medium having stored thereon instructions that, when executed by a machine, result in:
communicating between a server and a mobile device Time of Flight (ToF) accuracy information corresponding to a location area, said ToF accuracy information includes a plurality of accuracy indicators corresponding to a plurality of wireless communication nodes, an accuracy indicator of said plurality of accuracy indicators indicates an accuracy of a ToF measurement at said location area with a wireless communication node of said plurality of wireless communication nodes, said accuracy indicator, which is communicated as part of the ToF accuracy information, includes a Line of Sight (LOS) indicator indicating whether or not a LOS exists between said location area and said wireless communication node.

26. The product of claim 25, wherein said instructions result in receiving said ToF accuracy information from a-said server based on the location area.

27. The product of claim 25, wherein said instructions result in transmitting said ToF accuracy information to the mobile device based on a location area of the mobile device.

* * * * *

UNITED STATES PATENT AND TRADEMARK OFFICE
CERTIFICATE OF CORRECTION

| | | |
|---|---|---|
| PATENT NO. | : 9,629,116 B2 | Page 1 of 1 |
| APPLICATION NO. | : 14/129300 | |
| DATED | : April 18, 2017 | |
| INVENTOR(S) | : Uri Schatzberg et al. | |

It is certified that error appears in the above-identified patent and that said Letters Patent is hereby corrected as shown below:

In the Claims

In Column 26, Line 1, in Claim 1, delete "Tot" and insert -- ToF --, therefor.

In Column 26, Line 2, in Claim 1, before "Line of Sight" insert -- a --.

In Column 28, Line 37, in Claim 26, delete "a-said" and insert -- said --, therefor.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*